(12) United States Patent
Appel et al.

(10) Patent No.: US 6,448,218 B2
(45) Date of Patent: *Sep. 10, 2002

(54) MODIFIED ALUMINOSILICATE

(75) Inventors: Peter Willem Appel, DC Rotterdam; Theodorus Johannes Cornelius Arts, Maastricht, both of (NL); Carolyn Angela Lanceley, Chester (GB); Theo Jan Osinga, AN Cadier en Keer (NL)

(73) Assignee: Crosfield Limited, Warrington (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,652

(22) PCT Filed: Mar. 7, 1997

(86) PCT No.: PCT/EP97/01208

§ 371 (c)(1),
(2), (4) Date: Aug. 3, 1999

(87) PCT Pub. No.: WO97/34980

PCT Pub. Date: Sep. 25, 1997

(30) Foreign Application Priority Data

Mar. 15, 1996 (GB) ................................. 9605533

(51) Int. Cl.[7] .............................. C11D 3/08; C11D 7/14; C01B 33/26; C01B 39/02
(52) U.S. Cl. ................ 510/507; 510/511; 510/466; 510/315; 510/323
(58) Field of Search .................... 510/315, 323, 510/511, 507, 466

(56) References Cited

U.S. PATENT DOCUMENTS

| 3,740,347 A | * | 6/1973 | Rosen et al. ............... 252/455 |
| 4,265,777 A | * | 5/1981 | Boyer et al. ............... 252/113 |
| 4,405,484 A | * | 9/1983 | Miyazaki et al. ...... 252/174.25 |
| 5,583,098 A | * | 12/1996 | Boskamp et al. ........... 510/351 |
| 5,854,198 A | * | 12/1998 | Appel et al. ............... 510/444 |

FOREIGN PATENT DOCUMENTS

| EP | 0087035 A | * | 2/1983 |
| EP | 0 087 035 | | 8/1983 |
| EP | 0 533 392 | | 3/1993 |
| EP | 0657527 A | * | 12/1993 |
| EP | 0 657 527 | | 6/1995 |
| EP | 657527 A1 | * | 6/1995 |
| FR | 2.143.340 | * | 6/1972 |
| FR | 2 143 340 | | 2/1973 |
| GB | 2287948 A | * | 10/1995 |
| GB | 2 287 948 | | 10/1995 |
| GB | 2 287 949 | | 10/1995 |
| GB | 2287949 A | * | 10/1995 |
| WO | 94/21558 | | 9/1994 |
| WO | 95 14767 | | 6/1995 |
| WO | WO 95/14767 | * | 6/1995 |

* cited by examiner

Primary Examiner—Mark Kopec
Assistant Examiner—Brian P. Mruk
(74) Attorney, Agent, or Firm—Pillsbury Winthrop LLP

(57) ABSTRACT

A modified aluminosilicate in powder form comprising alkali metal silicate deposited onto aluminosilicate of the zeolite P type particles presents increased Liquid Carrying Capacity.

19 Claims, No Drawings

MODIFIED ALUMINOSILICATE

FIELD OF THE INVENTION

The present invention relates to a modified aluminosilicate and more specifically to a modified aluminosilicate of the zeolite P type particularly useful in detergent compositions.

BACKGROUND OF THE INVENTION

The usefulness of zeolite P in detergent formulations has been acknowledged, for example in European Patent Application 0384070 (Unilever).

The zeolite P class includes a series of synthetic zeolite phases which may be in cubic configuration (also termed B or $P_c$) or tetragonal configuration (also termed $P_1$) but is not limited to these forms. The structure and characteristics of the zeolite P class are given in "Zeolite Molecular Sieves" of Donald W Breck (published 1974 and 1984 by Robert E Krieger of Florida USA). The zeolite P class has the typical oxide formula:

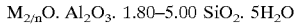

$$M_{2/n}O. Al_2O_3. 1.80-5.00\ SiO_2. 5H_2O$$

M is an n-valent cation which for this invention is an alkali-metal, that is lithium, potassium, sodium, cesium or rubidium with sodium and potassium being preferred and sodium being the cation normally used in commercial processes.

Thus sodium may be present as the major cation with another alkali metal present in a minor proportion to provide a specific benefit.

Now, zeolites used in detergents compositions must, on top of their detergent characteristics such as Calcium Binding Capacity, Calcium Effective Binding Capacity and Calcium uptake rate, exhibit other characteristics which render them usable as builders in concentrated detergents compositions.

The ability for a builder to be used in such concentrated formulations relates directly to its Liquid Carrying Capacity also referred to as Oil Absorption. The higher the Liquid Carrying Capacity the more concentrated can be the detergents composition.

Moreover, whereas in the past powder detergents composition were produced by spray drying, a new manufacturing processes, known as non spray drying processes, have been proposed. In these processes, the Liquid Carrying Capacity of the builder is of even greater importance.

Now, it is known that, depending on the drying conditions, the Liquid Carrying Capacity of certain products can vary within a great range. For example, the zeolite P disclosed in EP-B-0384070 can have, depending on its drying conditions, a Liquid Carrying Capacity of from 50–65% to 100–110%, the lower values being reached with industrial drying conditions such as spray drying, turbo drying, flash drying or flash-ring drying.

Therefore, even though the Liquid Carrying Capacity of the zeolite P disclosed in EP-B-0384070 already enables it to be used as a builder in concentrated detergent compositions, there is nevertheless a need for increasing even more the Liquid Carrying Capacity in case of industrial drying conditions.

In other respects, even though the addition of silicates in detergents compositions is particularly useful to avoid corrosion, to improve bleach stability in the wash and to act as an anti-redeposition agent, its use in detergent compositions has dramatically decreased for a series of reasons.

First of all, the major detergent compositions are still using zeolite A (such as Doucil P, obtainable from Crosfield ltd.) as their builder. Now, it is known that when drying together zeolite A and silicate, large lumps of insoluble materials are formed something which gives rise to residues on the fabrics.

Secondly, sodium silicates with a $SiO_2:Na_2O$ molar ratio of between 1.6 and 3.2 are being avoided for safety reasons since they are classified as irritant due to their alkalinity. Silicates with a ratio of 3.3 or above are safe but do not dissolve easily and with a ratio of below 1.6 they are corrosive. Therefore there is a need for a new way to introduce alkali metal silicate in detergent compositions which obviate the above mentioned problems.

Now, it has been found that a specific combination of aluminosilicates of the zeolite P type and alkali metal silicate can, on the one hand dramatically increase the Liquid Carrying Capacity of the zeolite while, on the other hand, leading to a product which is no longer irritant and does not contribute significantly to the occurrence of residues on fabrics.

Tests and Definitions i) Average weight particle size, $d_{50}$

The quantity "$d_{50}$" indicates that 50% by weight of the particles have a diameter smaller than that figure, and may be measured using a Sedigraph (Trade Mark), type 5100, ex Micromeritics.

ii) pH pH measurements were performed by making a 5% dispersion of zeolite (dry solids basis) in demineralised water, followed by measurement with a Orion EA940 ion analyzer, using a Orion 9173b pH-electrode.

iii) CEBC (Calcium Effective Binding Capacity)

The CEBC was measured in the presence of a background electrolyte to provide a realistic indicator of calcium ion uptake in a wash liquor environment. A sample of each zeolite was first equilibrated to constant weight over a saturated sodium chloride solution and the water content measured. Each equilibrated sample was dispersed in water ($1\ cm^3$) in an amount corresponding to 1 g $dm^{-3}$ (dry), and the resulting dispersion ($1\ cm^3$) was injected into a stirred solution, consisting of 0.01 M NaCl solution ($50\ cm^3$) and 0.05M $CaCl_2$ ($3.923\ cm^3$), therefore producing a solution of total volume $54.923\ cm^3$. This corresponded to a concentration of 200 mg CaO per liter, i.e. just greater than the theoretical maximum amount (197 mg) that can be taken up by a zeolite of Si:Al ratio 1.00. The change in $Ca^{2+}$ ion concentration was measured by using a $Ca^{2+}$ ion selective electrode, the final reading being taken after 15 minutes. The temperature was maintained at 25° C. throughout. The $Ca^{2+}$ ion concentration measured was subtracted from the initial concentration, to give the effective calcium binding capacity of the zeolite sample as mg CaO/g zeolite (on dry basis).

iv) LCC (Liquid Carrying Capacity

This was determined on the basis of the ASTM spatula rub-out method (American of Test Material Standards D281). The test is based on the principle of mixing nonionic (Synperonic A3, available from ICI) with the particulate zeolite by rubbing with a spatula on a smooth surface until a stiff putty like paste is formed which will not break or separate when it is cut with the spatula. The weight of nonionic used is then put into the equation:

$$LCC = \frac{\text{g nonionic absorbed}}{\text{wt of zeolite (gms)}} \times 100$$

$$= \text{g nonionic}/100 \text{ g zeolite}$$

v) Grit

Grit is defined here as the percentage of particles which are left behind on a 45 μm sieve. Zeolite is slurried with water in a beaker, ultrasonically treated for 15 minutes and next placed in the sieving machine (Mocker). This machine is subsequently flushed with water (water pressure 4 bar) for a certain period of time.

The sieve is removed from the machine and dried in an oven (90° C., 15 min.) and the amount of residue determined.

$$\text{grit } (\%) = \frac{\text{residue}}{\text{wt of zeolite (dry basis)}}$$

General Description of the Invention

It is a first object of the present invention to provide a modified aluminosilicate in powder form comprising alkali metal silicate deposited onto aluminosilicate of the zeolite P type particles.

Preferably, the aluminosilicate of the zeolite P type has a silicon to aluminium ratio not greater than 1.33, preferably not greater than 1.07. Preferably also it has a Calcium Effective Binding Capacity of at least 140 mg CaO/g zeolite (on dry basis).

By having the alkali metal silicate deposited onto the aluminosilicate, a completely homogeneous mixture of the two products is achieved something which means that, when introduced into a detergent composition the two products are evenly distributed and that there is no local variation in the aluminosilicate/alkali metal silicate weight ratio in the detergent composition.

The modified aluminosilicate according to the present invention has a pH of between 10 and 12. This relatively low alkalinity renders the product not irritant. Moreover, the fact that the alkali metal silicate and the aluminosilicate are evenly distributed means, particularly, that no pH variation can occur due to local variation in the aluminosilicate/alkali metal silicate weight ratio something which renders the modified aluminosilicate according to the present invention particularly safe.

Typically, the modified aluminosilicate in powder form according to the present invention contains 0% to 25% water, preferably not more than 12% by weight.

Preferably, the modified aluminosilicate comprises 65 to 90%, preferably 70 to 87%, most preferably 75 to 85% by weight (on dry basis) of aluminosilicate of the zeolite P type and 1 to 20%, preferably 3 to 15%, most preferably 5 to 10% by weight (on dry basis) of alkali metal silicate. More preferably the (aluminosilicate of the zeolite P type/alkali metal silicate) weight ratio is within the range of 100/20 to 100/1, preferably 100/15 to 100/3, more preferably 100/10 to 100/5.

Also preferably, the alkali metal silicate is sodium silicate having a $SiO_2:Na_2O$ molar ratio of between 1.6 and 4.

Preferably also the modified aluminosilicate according to the present invention has an average weight particle size of 1 μm to 10 μm, preferably between 1.5 μm and 6 μm, more preferably between 2.5 μm and 5 μm. Such a particle size distribution contributes to the avoidance of residues on fabrics.

The modified aluminosilicate according to the present invention exhibits good detergent characteristics, the CEBC being typically between 110 and 160 mg CaO/g modified aluminosilicate (on dry basis), more preferably between 130 and 155 mg CaO/g modified aluminosilicate (on dry basis).

Various other additives can be added to the modified aluminosilicate of the invention and it can further contain an effective amount of additive selected from the group consisting of phosphonates, amino carboxylates, polycarboxylates, citrates, and mixtures thereof, usually at levels from 0.3% to 5.0% by weight of said modified aluminosilicate (on dry basis).

The modified aluminosilicate according to the present invention can be further granulated according to standard granulating/agglomerating processes.

It is a second object of the present invention to provide a process for the production of a modified aluminosilicate wherein to a slurry of aluminosilicate of the zeolite P type, containing 20 to 46% solids, more preferably 30–40% solids, is added an alkali metal silicate, the resulting mixture being further dried.

Preferably, the alkali metal silicate is sodium silicate having a $SiO_2:Na_2O$ molar ratio of between 1.6 and 4.

Preferably also, alkali metal silicate is added as a solution but could also be in powder form.

Preferably the alkali metal silicate solution is added to a slurry of undried zeolite P obtained for example as in example 11 of EP-A-565,364. By undried zeolite P, it is understood a zeolite P as obtained after washing and filtering but before drying.

It has been noted that, when fast drying the filter cake obtained in the process disclosed in EP-A-565,364, the average particle size of the zeolite P decreases from about 3 μm to about 1 μm. Now, if at least 3–4% sodium silicate is added before drying, the average particle size of the product remains unchanged. This behaviour leads to the surprising result that, with a higher particle size, the Liquid Carrying Capacity of the end product (modified alumino silicate of the invention) is increased whereas all the prior art teaches that Liquid Carrying Capacity is increased when particle size is decreased.

Upon milling of this material, the Liquid Carrying Capacity of the modified aluminosilicate according to the present invention can be reduced.

Preferably, carbon dioxide is introduced during the drying process. By doing so, the alkali metal silicate is, at least partially, neutralized.

The modified aluminosilicate according to the present invention may be incorporated in detergent compositions of all physical types, for example, powders, liquids, gels and solid bars, at the levels normally used for detergency builders.

The modified aluminosilicate material of the invention may be used as a sole detergency builder, or it may be used in conjunction with other builder materials such zeolite A or zeolite P. As well as the crystalline aluminosilicate builders already mentioned, other inorganic or organic builders may be present. Inorganic builders that may be present include sodium carbonate, amorphous aluminosilicates, and phosphate builders, for example, sodium orthophosphate, pyrophosphate and tripolyphosphate.

The total amount of detergency builder in the composition will suitably range from 20 to 80% by weight, and this may be constituted wholly or partially by the modified aluminosilicate material of the invention. The modified aluminosilicate material of the invention may if desired be used in combination with other aluminosilicates, for example, zeolite A. The total amount of aluminosilicate material in the composition may, for example, range from about 5 to 80% by weight preferably from 10 to 60% by weight.

Organic builders that may additionally be present include polycarboxylate polymers such as polyacrylates and acrylic/maleic copolymers; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates, alkyl- and alkenylmalonates and succinates; and sulphonated fatty acid salts.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %.

Builders, both inorganic and organic, are preferably present in alkali metal salt, especially sodium salt, form.

The modified aluminosilicate of the invention is of especial applicability to detergent compositions containing no, or reduced levels of, inorganic phosphate builders such as sodium tripolyphosphate, orthophosphate and pyrophosphate.

Detergent compositions containing the modified aluminosilicate of the invention will also contain, as essential ingredients, one or more detergent-active compounds which may be chosen from soap and non-soap anionic, cationic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and nonionic compounds.

Anionic surfactants are well-known to those skilled in the art. Examples include alkylbenzene sulphonates, particularly linear alkylbenzene sulphonates having an alkyl chain length of $C_8$–$C_{15}$; primary and secondary alkylsulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

The choice of detergent-active compound (surfactant), and the amount present, will depend on the intended use of the detergent composition. For example, for machine dishwashing a relatively low level of a low-foaming nonionic surfactant is generally preferred. In fabric washing compositions, different surfactant systems may be chosen, as is well known to the skilled formulator, for handwashing products and for products intended for use in different types of washing machine.

The total amount of surfactant present will also depend on the intended end use and may be as low as 0.5 wt %, for example, in a machine dishwashing composition, or as high as 60 wt %, for example, in a composition for washing fabrics by hand. In compositions for machine washing of fabrics, an amount of from 5 to 40 wt % is generally appropriate.

Detergent compositions suitable for use in most automatic fabric washing machines generally contain anionic non-soap surfactant, or nonionic surfactant, or combinations of the two in any ratio, optionally together with soap.

Anionic surfactants, soaps and higher-ethoxylated nonionic surfactants may generally be included in the base powder. Lower-ethoxylated surfactants may more suitably be post-added.

Detergent compositions containing the modified aluminosilicate according to the invention may also suitably contain a bleach system. The invention is especially concerned with compositions containing peroxy bleach compounds capable of yielding hydrogen peroxide in aqueous solution, for example inorganic or organic peroxyacids, and inorganic persalts such as the alkali metal perborates, percarbonates, perphosphates, persilicates and persulphates. As indicated above, the invention is more especially concerned with compositions containing sodium percarbonate.

Bleach ingredients are invariably postdosed.

The sodium percarbonate may have a protective coating against destabilisation by moisture. Sodium percarbonate having a protective coating comprising sodium metaborate and sodium silicate is disclosed in GB 2 123 044B (Kao).

The peroxy bleach compound, for example sodium percarbonate, is suitably present in an amount of from 5 to 35 wt %, preferably from 10 to 25 wt %.

The peroxy bleach compound, for example sodium percarbonate, may be used in conjunction with a bleach activator (bleach precursor) to improve bleaching action at low wash temperatures. The bleach precursor is suitably present in an amount of from 1 to 8 wt %, preferably from 2 to 5 wt %.

Preferred bleach precursors are peroxycarboxylic acid precursors, more especially peracetic acid precursors and peroxybenzoic acid precursors; and peroxycarbonic acid precursors. An especially preferred bleach precursor suitable for use in the present invention is N,N,N',N'-tetracetyl ethylenediamine (TAED).

A bleach stabiliser (heavy metal sequestrant) may also be present. Suitable bleach stabilisers include ethylenediamine tetraacetate (EDTA) and the polyphosphonates such as Dequest (Trade Mark), EDTMP.

Other materials that may be present in detergent compositions containing the modified aluminosilicate of the invention such as alkali metal, preferably sodium, carbonate, in order to increase detergency and ease processing. Sodium carbonate may suitably be present in amounts ranging from 1 to 60 wt %, preferably from 2 to 40 wt %. However, compositions containing little or no sodium carbonate are also within the scope of the invention. Sodium carbonate may be included in the base powder, or postdosed, or both.

Powder flow may be improved by the incorporation of a small amount of a powder structurant, for example, a fatty acid (or fatty acid soap), a sugar, an acrylate or acrylate/maleate polymer, in the base powder. A preferred powder structurant is fatty acid soap, suitably present in an amount of from 1 to 5 wt %.

Other materials that may be present in detergent compositions of the invention include antiredeposition agents such as cellulosic polymers; soil release polymers; fluorescers; inorganic salts such as sodium sulphate; lather control agents or lather boosters as appropriate; proteolytic and lipolytic enzymes; dyes; coloured speckles; perfumes; foam controllers; and fabric softening compounds.

Detergent compositions containing the modified aluminosilicate of the invention may be prepared by any suitable method. Detergent powders can suitably be prepared by spray-drying a slurry of compatible heat-insensitive components, and then spraying on or postdosing those ingredients unsuitable for processing via the slurry. Detergent compositions containing the modified aluminosilicate of the invention are preferably prepared by non-spray-drying (non-tower) processes. The base powder is prepared by mixing and granulation, and other ingredients subsequently admixed (postdosed).

The base powder may suitably be prepared using a high-speed mixer/granulator. Processes using high-speed mixer/granulators are disclosed, for example, in EP 340 013A, EP 367 339A, EP 390 251A and EP 420 317A (Unilever).

Specific Description of the Invention

The present invention will be further described in the following examples.

EXAMPLE 1

A zeolite P obtained according to example 11 of EP-A-565,364 was produced. Before drying, but after washing and filtering to 36% dry solids, to the zeolite slurry was added a sodium silicate solution ($SiO_2$:$Na_2O$ molar ratio of 2) (43% dry solids) to reach a zeolite P/sodium silicate weight ratio of 10:1 (on dry basis). The obtained slurry was mixed well and subsequently dried in a VOMM dryer (obtainable from VOMM Impianti) using direct heated air ($CO_2$ content of the air appr. 2.2 weight %) to 90% dry solids.

EXAMPLE 2

The same recipe as in example 1 was used except that the zeolite P/sodium silicate weight ratio of the end slurry (after addition of sodium silicate) was 100:7.5 (on dry basis).

EXAMPLE 3

A zeolite P obtained according to example 11 of EP-A-565,364 was produced. Before drying, but after washing and filtering to 35% dry solids, to the zeolite slurry was added a sodium silicate solution ($SiO_2$:$Na_2O$ molar ratio of 2) (43% dry solids) to reach a zeolite P/sodium silicate weight ratio of 10:1 (on dry basis). This slurry was filtered to 40.9% dry solids (d.s.).

The obtained filtercake was next mixed with a polymer solution (Narlex MA340, ex National Starch, 40% d.s.) to reach a sodium silicate/polymer weight ratio of 20:2:1.

The obtained material was subsequently dried in a lab fluid bed dryer (make Retsch) to 90% d.s..

EXAMPLE 4

A zeolite P obtained according to example 11 of EP-A-565,364 was produced. Before drying, but after washing and filtering to 35% dry solids, to the zeolite slurry was added a sodium silicate solution ($SiO_2$:$Na_2O$ molar ratio of 2) (43% dry solids) to reach a zeolite P/sodium silicate weight ratio of 100:8 (on dry basis). This slurry was filtered to 39.8% d.s..

The obtained filtercake was next mixed with a polymer solution (Narlex MA340, ex National Starch, 40% d.s.) to reach a sodium silicate/polymer weight ratio of 100:8:4.

The obtained material was subsequently dried in a lab fluid bed dryer (make Retsch) to 90% d.s..

The products obtained in examples 1 to 4 had the following characteristics.

|  | Exp. 1 | Exp. 2 | Exp. 3 | Exp. 4 |
| --- | --- | --- | --- | --- |
| $d_{50}$ (μm) | 3.12 | 2.8 | 2.8 | 2.8 |
| pH | 11.3 | 11.1 | 11.7 | 11.7 |
| CEBC | 134 | 142 | 137 | 131 |
| LCC (%) | 83 | 82 | 72 | 73 |
| Grit (%) | 0.27 | 0.13 | 0.01 | 0.01 |

What is claimed is:

1. A modified aluminosilicate in powder form useful as an additive in detergent compositions consisting of 65% to 90% by weight, on a dry basis, of zeolite P aluminosilicate, 1 to 20% by weight, on a dry basis, of alkali metal silicate and 0 to 25% by weight water, and having an average weight particle size of 1 μm to 10 μm, wherein said alkali metal silicate is deposited onto said zeolite P aluminosilicate.

2. A modified aluminosilicate according to claim 1 wherein the weight ratio of zeolite P aluminosilicate to alkali metal silicate is within the range of 100:20 to 100:30 on a dry basis.

3. A modified aluminosilicate according to claim 1 wherein the alkali metal silicate is sodium silicate having a $SiO_2$:$Na_2O$ molar ratio of between 1.6 and 4.

4. A modified aluminosilicate according to claim 1 having a Calcium Effective Binding Capacity of between 110 and 160 mg CaO/g modified aluminosilicate, on dry basis.

5. A modified aluminosilicate according to claim 1 having a pH of between 10 and 12 when measured at a concentration of 5% by weight, based on dry solids, in deionized water.

6. A process for the production of a modified aluminosilicate according to claim 1, wherein to a slurry of zeolite P aluminosilicate, containing 29 to 46% solids, is added an alkali metal silicate, the resulting mixture being dried.

7. A modified aluminosilicate according to claim 1 comprising 70 to 87% by weight, on dry basis, of zeolite P aluminosilicate and 1 to 20%, on dry basis, of alkali metal silicate.

8. A modified aluminosilicate according to claim 1 comprising 75 to 85% by weight, on dry basis, of zeolite P aluminosilicate and 1 to 20%, on dry basis, of alkali metal silicate.

9. A modified aluminosilicate according to claim 1, comprising 3 to 15% by weight, on dry basis, of alkali metal silicate.

10. A modified aluminosilicate according to claim 1, comprising 5 to 10% by weight, on dry basis, of alkali metal silicate.

11. A modified aluminosilicate according to claim 1 in which the weight ratio of zeolite P aluminosilicate to alkali metal silicate is within the range of 100:15 to 100:3 on a dry basis.

12. A modified aluminosilicate according to claim 1 in which the weight ratio of zeolite P aluminosilicate to alkali metal silicate is within the range of 100:10 to 100:5 on a dry basis.

13. A modified aluminosilicate according to claim 1 having an average weight particle size between 1.5 μm and 6 μm.

14. A modified aluminosilicate according to claim 1 having an average weight particle size between 2.5 μm and 5 μm.

15. A modified aluminosilicate according to claim 1 having a Calcium Effective Binding Capacity of between 130 and 155 mg CaO/g modified aluminosilicate, on dry basis.

16. A process according to claim 9 wherein said slurry contains 30 to 40% solids.

17. A process for the production of a modified aluminosilicate according to claim 1, comprising producing a slurry of undried zeolite P, adding to the slurry an alkali metal silicate and drying the resulting mixture.

18. A modified aluminosilicate particle comprising of:
a) zeolite P aluminosilicate;
b) alkali metal silicate; and
c) water;
wherein said alkali metal silicate is deposited onto said zeolite P aluminosilicate.

19. A modified aluminosilicate in powder form useful as an additive in detergent compositions, said modified aluminosilicate consisting of and containing 65 to 90% by weight, on a dry basis, of zeolite P aluminosilicate, 1 to 20% by weight, on a dry basis, of alkali metal silicate, 0 to 25% by weight water and from 0.3 to 5% by weight of an additive selected from the group consisting of phosphonates, amino carboxylates, citrates and mixtures thereof, and having an average weight particle size of 1 μm to 10 μm, wherein said alkali metal silicate is deposited onto said zeolite P aluminosilicate.

* * * * *